United States Patent
Hsu et al.

(10) Patent No.: US 7,532,818 B2
(45) Date of Patent: May 12, 2009

(54) APPARATUS AND METHOD FOR MEASURING COHERENCE SAMPLING QUALITY-FACTOR

(75) Inventors: Dar-Zu Hsu, Tainan County (TW); San-Liang Lee, Taipei (TW)

(73) Assignee: Industrial Technology Research Institute, Hsinchu, Taiwan (CN)

( * ) Notice: Subject to any disclaimer, the term of this patent is extended or adjusted under 35 U.S.C. 154(b) by 546 days.

(21) Appl. No.: 11/475,877

(22) Filed: Jun. 28, 2006

(65) Prior Publication Data

US 2007/0154214 A1 Jul. 5, 2007

(30) Foreign Application Priority Data

Dec. 30, 2005 (TW) .............................. 94147565 A

(51) Int. Cl.
*H04B 10/08* (2006.01)
*H04B 17/00* (2006.01)
(52) U.S. Cl. .............................. 398/27; 398/16; 398/26
(58) Field of Classification Search .................. 398/27, 398/33, 9, 16, 25, 26
See application file for complete search history.

(56) References Cited

U.S. PATENT DOCUMENTS

| 6,980,737 | B1 * | 12/2005 | Anslow et al. ................ 398/27 |
| 7,042,629 | B2 | 5/2006 | Doerr et al. |
| 2002/0141009 | A1 * | 10/2002 | Yu et al. ..................... 359/110 |
| 2004/0218919 | A1 * | 11/2004 | Hunsche et al. .............. 398/27 |
| 2005/0152693 | A1 * | 7/2005 | Grand et al. .................. 398/27 |

* cited by examiner

*Primary Examiner*—M. R. Sedighian
(74) *Attorney, Agent, or Firm*—Harness, Dickey & Pierce, P.L.C.

(57) ABSTRACT

An apparatus and method for measuring a coherence sampling quality-factor (Q-factor) are provided, which are used to monitor quality of an optical signal in an optical network in real time. The quality is evaluated by a Q-factor. A laser diode and a wavelength converter are used in the apparatus to achieve wavelength coherence and amplification of the optical signal. Furthermore, the laser diode and an optical switch are used together to obtain an optical pulse that can be utilized to sample the optical signal. Therefore, after entering into an optoelectronic converter, a baseband signal in the optical signal is reconstructed through the amplification of the optical signal and the coupling of the optical pulse, so as to detect the Q-factor and to monitor the quality of the optical signal.

20 Claims, 4 Drawing Sheets

APPARATUS AND METHOD FOR MEASURING COHERENCE SAMPLING QUALITY-FACTOR

CROSS-REFERENCE TO RELATED APPLICATIONS

This non-provisional application claims priority under 35 U.S.C. § 119(a) on Patent Application No(s). 094147565 filed in Taiwan, R.O.C. on Dec. 30, 2005, the entire contents of which are hereby incorporated by reference.

BACKGROUND OF THE INVENTION

1. Field of Invention

The present invention relates to an apparatus and a method for measuring quality of an optical signal, which are used in a monitoring system of an optical network to detect the quality factor (Q-factor) of the optical signal and to evaluate the bit error rate (BER) of the optical signal.

2. Related Art

With the development of high speed optical networks and all-optical networks, transmission rates have increased to tera-bit per second and transmission distances have become longer and longer. When an optical signal is transmitted in a channel, the quality of the data transmitted will be influenced by many factors. Thus, a desirable optical signal quality monitoring system must be established to effectively manage the optical network and improve the efficiency thereof. However, with the gradual decrease in the number of conventional electrical nodes, the electric network performance monitors with the conventional electrical nodes have gradually disappeared. Therefore, a method suitable for an all-optical network and with functionality equivalent to that of an electric network performance monitor must be developed.

Referring to FIG. 1, it is an optical network 10. An optical signal is transmitted from an optical node 101 disposed in the optical network 10 to another optical node 102 through the wavelength division multiplexing (WDM) technology 110. Optical performance monitoring (OPM) is performed in the optical channel to detect the quality of the optical channel. Through the optical performance monitoring, the power, the wavelength, the signal-to-noise ratio, and the like of the optical signal can be measured. However, in order to more accurately monitor the quality of the signal, especially for a digital transmission system, there are generally two parameters for evaluating the performance: BER and Q-factor. The detection of the BER requires a relatively complicated setting, and the lower the BER is, the longer the measuring time will be. For example, for a 10 Gbps signal, when the detected BER is reduced to 10E-12, i.e., one bit error appears for every $10^{12}$ bits transmitted, the measurement time required is 100 seconds. When the detected BER is reduced to 10E-13, the measurement time required is 1000 seconds. When the detected BER is reduced to 10E-15, the measurement time required is 27 hours. Therefore, through this method, some real-time audio-visual signals cannot be monitored in real time, thus errors cannot be found out instantly and effectively. In this case, since the Q-factor can be used to evaluate the BER in principle and can be rapidly measured, the Q-factor, instead of the BER, can serve as the parameter to evaluate system performance. A higher Q-factor corresponds to a lower BER and indicates an optical signal with a higher quality. Additionally, the BER cannot be measured until all signals have been received, such that it can only be measured at a receiving end. The Q-factor can be measured at any time during the transmission of the signal without interrupting the transmitted signal. Therefore, compared with the measurement of the BER, the measurement of the Q-factor is more flexible and more suitable for real-time optical channel transmission systems.

The definition of the Q-factor is represented by Equation (1):

$$Q = \frac{|\mu_1 - \mu_0|}{\sigma_1 + \sigma_0}. \quad (1)$$

In equation (1), $\mu_1$ and $\mu_0$ respectively represent the average value of individual measurements when the received optical signal is at level "1" and level "0"; while $\sigma_1$ and $\sigma_0$ respectively represent the standard deviation of individual measurements when the received optical signal is at level "1" and level "0". If the noise probability distribution at the receiving end is a Gaussian distribution, and the intersymbol interference (ISI) can be neglected, the relationship expression between the Q-factor and the BER can be represented by Equation (2):

$$BER = \frac{1}{2}\mathrm{erfc}\left[\frac{Q}{\sqrt{2}}\right] \approx \frac{\exp\left(\frac{-Q^2}{2}\right)}{Q\sqrt{2\pi}}. \quad (2)$$

Referring to FIG. 2, it is a curve 20 of the Q-factor corresponding to the BER. The transverse axis in the curve represents the Q-factor 201 and the longitudinal axis represents the BER 202. The corresponding relationship between the Q-factor and the BER forms a curve. It can be seen from FIG. 2 that, the BER becomes smaller as the Q-factor becomes larger.

A Q-factor measuring module can be implemented in an optical network transmission system architecture. Referring to FIG. 3, it shows a Q-factor parameter monitoring system architecture 30. A tunable laser diode 301 generates an optical signal 931, which is then modulated by an electro-optic modulator 302. Then, the optical signal 931 is further transmitted to an erbium doped fiber amplifier (EDFA) 304 via an optical fiber 303. The erbium doped fiber amplifier (EDFA) amplifies the power of the optical signal, and inputs the optical signal 931 into an optical splitter 305. Then, the optical splitter 305 splits the optical signal 931 into two parts, wherein one part is transmitted to a next optical node 306; and the other part is input into a Q-factor measuring module 307. Thus, the Q-factor measuring module may finish measuring the Q-factor in cooperation with a signal processor 308 without interrupting the transmission of a network signal. Therefore, the operation of the network will not be influenced.

However, in order not to influence the normal operation of the network, the power of the optical signal assigned to be monitored by the Q-factor measuring module 307 is generally quite small, which requires the monitoring module with high measurement sensitivity, such that the complexity and cost of equipment are increased. In conventional optical communication, a coherent detection technique can be used to detect a weak received signal, which will not generate a great amount of noise or change the features of the signal. The coherent detection requires a local oscillator to generate a continuous wave with the same wavelength/frequency and phase, which is also called homodyne. Furthermore, the power of continuous wave is many times larger than that of the weak received signal, such that the weak received signal can be amplified without generating additional noise and influencing the original features. Referring to FIG. 4, it is a coherent detection module 40 of the prior art. The tunable laser diode 401 is a local oscillator that generates an optical signal LO(t). A wideband optical frequency locking loop 405 is used to lock the optical signal LO(t) of the tunable laser diode 401 at the wavelength that is the same as that of a tested optical signal 941, wherein the tested optical signal 941 is just one part of the optical signal 931 that enters into the Q-factor measuring module 307 after being split by the optical splitter 305. The base equation is listed as follows:

$$S(t)=m(t)\cos(\omega_c t) \quad (3);$$

$$LO(t)=A\cos(\omega_c t) \quad (4);$$

$$\{S(t)+LO(t)\}^2=S^2(t)+LO^2(t)+2S(t)\times LO(t) \quad (5);$$

$$S(t)\times LO(t)=\tfrac{1}{2}[Am(t)+Am(t)\cos(2\omega_c t)] \quad (6).$$

In Equation (3), S(t) represents the tested optical signal 941; m(t) represents a baseband signal; and $w_c$ represents a frequency of an optical carrier wave. In Equation (4), LO(t) represents the signal generated by the tunable laser diode 401. Through the wideband optical frequency locking loop 405, LO(t) generated by the tunable laser diode 401 may have the same wavelength as that of S(t). A is an amplitude of LO(t) and represents a power strength that is often much larger than that of m(t). The optical signals S(t) and LO(t) with the same wavelength enter into an optical receiver 403 after being coupled by the optical coupler 402. As expressed by Equations (5) and (6), high-frequency signals $S^2(t)$, $LO^2(t)$, and $Am(t)\cos(2\omega_c t)$ in the coupled signal $\{S(t)+LO(t)\}^2$ are filtered out by a filter in the optical receiver 403. Finally, an amplified output signal 942, i.e., Am(t), is obtained from the signal processor 404, wherein the output signal 942 is A times larger than the baseband signal m(t). It can be known that the coherent detection is used to detect the weak signal, so it amplifies the weak signal and reconstruct the waveform.

As for a conventional coherent detection module, such as that disclosed in U.S. Pat. No. 7,042,629 issued on May 9, 2006, in the Q-factor monitoring technology, a wavelength tunable optical pulse laser with the same wavelength as that of a tested optical signal and the tested optical signal are coupled together to enter into the optical receiver. An optical pulse generated by the wavelength tunable optical pulse laser is used to replace the aforementioned continuous wave to amplify and sample the signal, wherein the process of providing the same wavelength is achieved through a wideband optical frequency locking loop. However, although such architecture achieves Q-factor monitoring, the complexity and the equipment cost are relatively high, and it is difficult for the wideband optical frequency locking loop to achieve the phase coherence of the optical signal during high frequency operation.

SUMMARY OF THE INVENTION

In order to solve the aforementioned problems, the present invention discloses an apparatus and a method for measuring a coherent sampling Q-factor based on a wavelength converter, which can be used to achieve the object of coherent detection without employing an optical frequency locking loop.

The apparatus for measuring a coherent sampling Q-factor based on a wavelength converter comprises a laser diode, a wavelength converter, and an optical switch. As for the technical means of the apparatus, the wavelength converter and the laser diode are used together to convert the wavelength of an input optical signal, wherein the wavelength of the optical signal is converted to be the same as that of the laser diode to meet the requirement of wavelength coherence; and the optical switch and the laser diode are used together to generate an optical pulse to meet the requirement of sampling. In view of the above, the apparatus and the method disclosed by the present invention are directed to reduce the equipment complexity and cost, and to achieve the purposes of sampling the optical signal and measuring Q-factor thereof.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Both the foregoing general description about the present invention and the following detailed description about the embodiments are intended to demonstrate and explain the principles of the present invention, and to provide further explanations of the present invention as claimed.

BRIEF DESCRIPTION OF THE DRAWINGS

The present invention will become more fully understood from the detailed description given herein below for illustration only, and which thus is not limitative of the present invention, and wherein.

DETAILED DESCRIPTION OF THE INVENTION

Specific features and advantages of the present invention are illustrated below in detail through the following embodiments, which enables those skilled in the art to understand and implement the present invention accordingly. According to the content of the specification, claims, and accompanying figures, those skilled in the art may easily understand the objects and advantages of the present invention.

Figure 1:
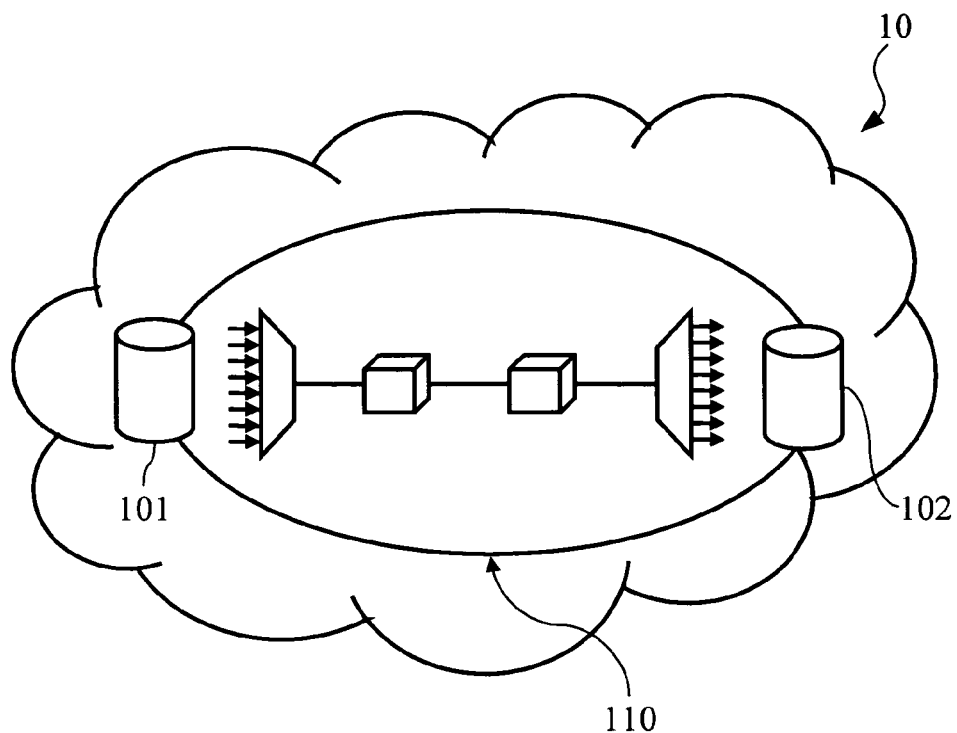
FIG. 1 shows an optical network of the prior art.
Figure 2:
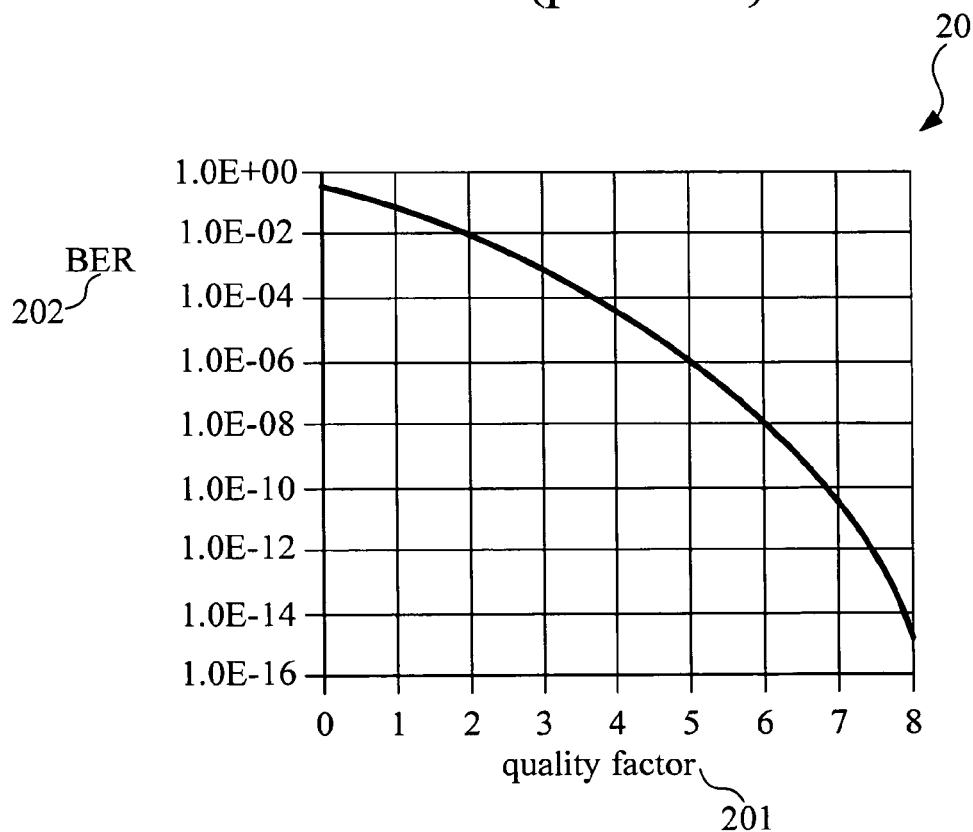
FIG. 2 is a curve of the quality factor corresponding to the BER of the prior art.
Figure 3:
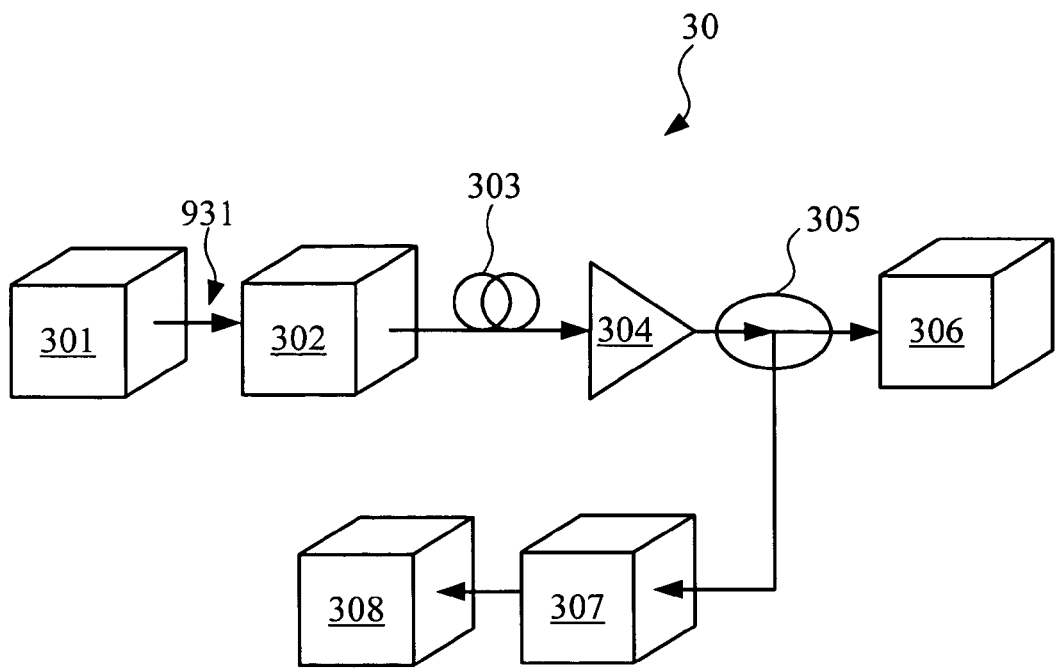
FIG. 3 shows a Q-factor parameter monitoring system architecture of the prior art.
Figure 4:
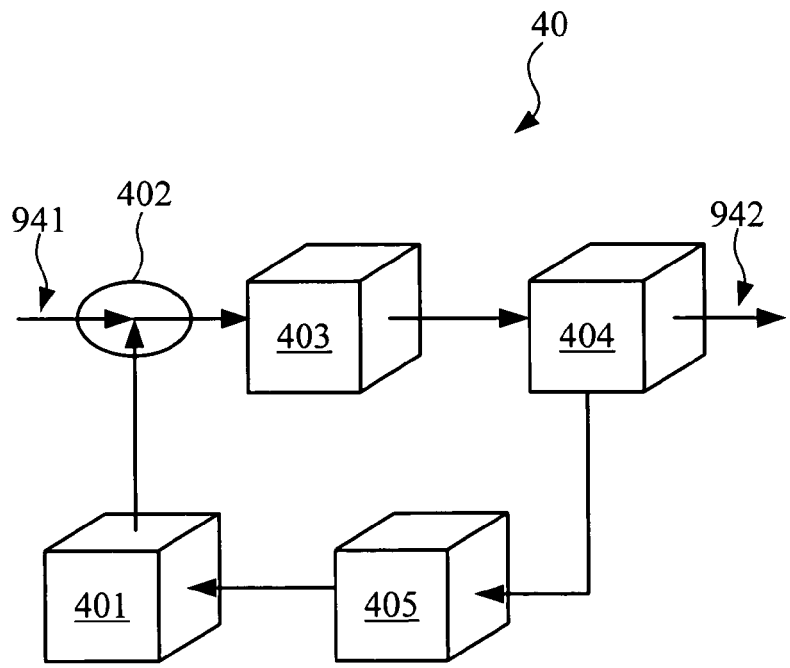
FIG. 4 shows a coherent detection module of the prior art.

As shown in FIG. 3, the optical signal 931 is split into two parts by the optical splitter 305, wherein one part of the optical signal 931 enters into the Q-factor measuring module 307 to receive an optical signal quality detection. The present invention provides a preferred embodiment directing to the Q-factor measuring module 307. In the present invention, the wavelength converter and the laser diode are used together to convert the wavelength of a tested optical signal to be the same as that of the laser diode, thereby meeting the requirements of wavelength coherence, and replacing the conventional complicated wideband optical frequency locking loop; and the optical switch and the laser diode are used together to generate an optical pulse, thereby meeting the requirements of wavelength coherence sampling, to replace the conventional expensive wavelength tunable optical pulse laser.

Figure 5:
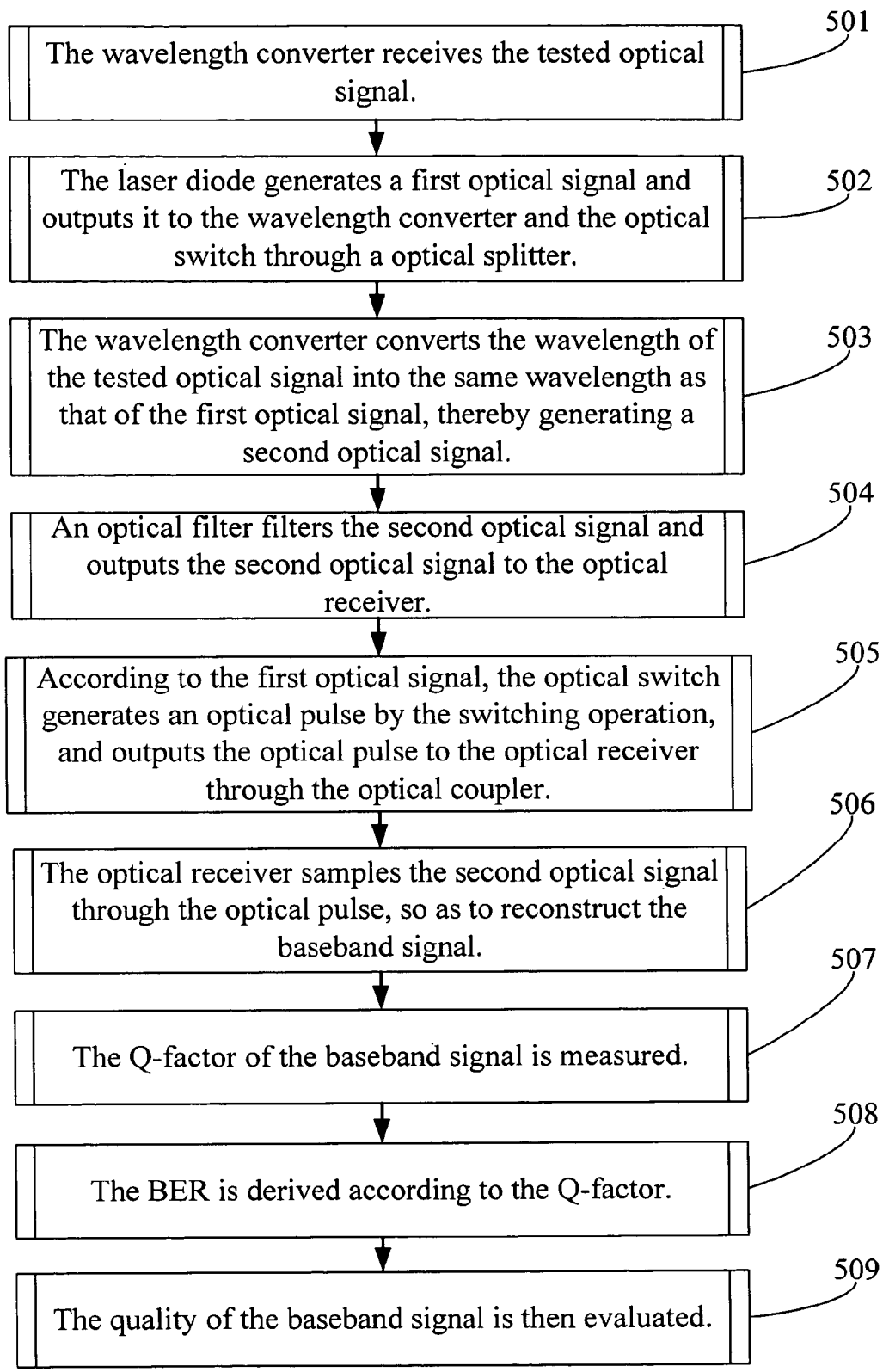
FIG. 5 is a flow chart of the method for measuring Q-factor according to the present invention.

Referring to FIG. 5, it is a flow chart of the method for measuring the Q-factor according to the present invention. The steps of the method are described as follows.

The wavelength converter receives the tested optical signal (Step 501). The laser diode generates a first optical signal and outputs it to the wavelength converter and the optical switch through an optical splitter (Step 502). The wavelength converter converts the wavelength of the tested optical signal into the same wavelength as that of the first optical signal, thereby generating a second optical signal (Step 503). An optical filter filters the second optical signal and outputs the second optical signal to the optical receiver (Step 504). According to the first optical signal, the optical switch generates an optical pulse by the switching operation, and outputs the optical pulse to the optical receiver through the optical coupler (Step 505). The optical receiver samples the second optical signal through the optical pulse, so as to reconstruct the baseband signal (Step 506). The Q-factor of the baseband signal is measured (Step 507). The BER is derived according to the Q-factor (Step 508). The quality of the baseband signal is then evaluated (Step 509).

Figure 6:
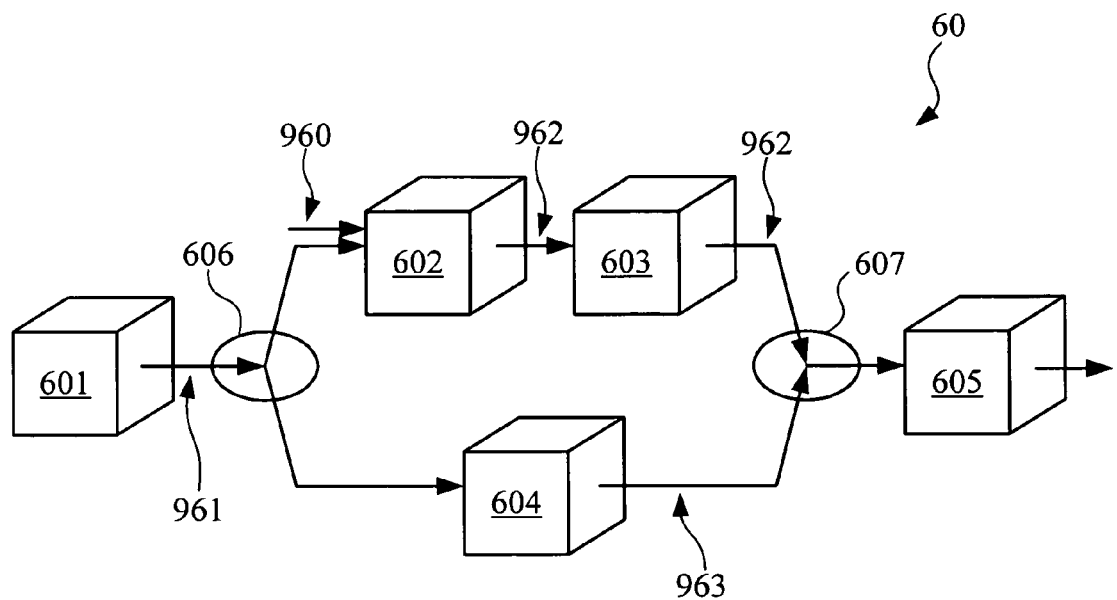
FIG. 6 is an embodiment of the apparatus for measuring the Q-factor according to the present invention.

Referring to FIG. 6, it is an embodiment of the apparatus for measuring the Q-factor according to the present invention. The Q-factor measuring apparatus 60 comprises a plurality of components, wherein each of the components operates according the flow chart of the Q-factor measuring method. The components include the laser diode 601, the wavelength converter 602, the optical filter 603, the optical switch 604, the optical receiver 605, the optical splitter 606, and the optical coupler 607. The tested optical signal 960 is the part of the optical signal 931 split through the optical splitter 305, wherein the tested optical signal 960 comprises an optical carrier wave $\cos(\omega_1 t)$ with the wavelength $\lambda_1$ and a baseband signal m(t). The tested optical signal 960 is input into the Q-factor measuring apparatus 60 to receive the Q-factor measurement.

The laser diode 601 may be a wavelength tunable laser diode or a wavelength fixed laser diode, wherein the two optical sources both can achieve wavelength coherence. The laser diode 601 outputs the first optical signal 961 comprising the optical carrier wave $\cos(\omega_2 t)$ with the wavelength $\lambda_2$. The first optical signal 961 is split into two parts by the optical splitter 606, wherein one part is output to the wavelength converter 602 and the other part is output to the optical switch 604.

The wavelength converter 602 is used to convert the wavelength of the optical signal. At this time, two optical signals, i.e., the tested optical signal 960 and the first optical signal 961, are input into the wavelength converter 602. The wavelength converter 602 converts the optical carrier wave $\cos(\omega_1 t)$ with the wavelength $\lambda_1$ in the tested optical signal 960 to be tested into the optical carrier wave $\cos(\omega_2 t)$ with the wavelength $\lambda_2$ in the first optical signal 961. That is, the tested optical signal 960 is optically converted into a signal with the same wavelength as the tunable laser diode, so as to achieve wavelength coherence.

For the tested optical signal 960 with the converted wavelength, only the wavelength $\lambda_1$ of the optical carrier wave $\cos(\omega_1 t)$ carrying the baseband signal m(t) is changed, while the baseband signal m(t) is not changed. After conversion, the second optical signal 962 is generated, which comprises the optical carrier wave $\cos(\omega_2 t)$ with the converted wavelength $\lambda_2$, and the baseband signal m(t). The output of the wavelength converter 602 is connected to the input of the optical filter 603.

The optical filter 603 is used to filter the second optical signal 962 to generate the optical carrier wave $\cos(\omega_2 t)$ purely with the wavelength $\lambda_2$ and the baseband signal m(t), and to output them to the optical receiver 605 after filtering.

In the optical splitter 606, the first optical signal 961 is split into two parts, wherein one part enters into the optical switch 604. The optical switch 604 generates the optical pulse 963 according to this part through a series of switching actions. Then, the optical pulse 963 and the second optical signal 962 filtered by the optical filter 603 are coupled together by the optical coupler 607 to enter into the optical receiver 605. The optical receiver 605 interferes the second optical signal 962 by using the optical pulse 963, so as to sample the second optical signal 962. Then, after sampling, the baseband signal m(t) is reconstructed. Then, the Q-factor of the baseband signal m(t) is measured, and the BER is derived through the Q-factor to evaluate the quality of the baseband signal m(t) to be tested.

Figure 7:
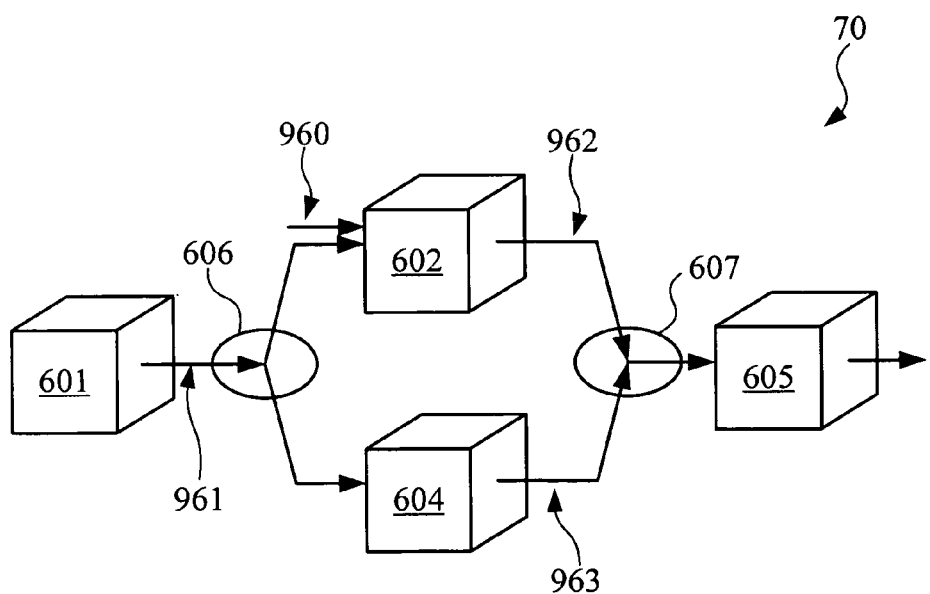
FIG. 7 is another embodiment of the apparatus for measuring the Q-factor according to the present invention.

Referring to FIG. 7, it is another embodiment of the apparatus for measuring the Q-factor according to the present invention. The laser diode 601 outputs the first optical signal 961 to the output end of the wavelength converter 602 in a direction opposite to that of inputting the tested optical signal 960. The optical filter 603 as shown in FIG. 6 can be omitted in the Q-factor measuring apparatus 70. Through such optical arrangement, an optical signal used only for converting the wavelength can be achieved, and the other components are the same as those illustrated in the above embodiment, and thus will not be described in detail again.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An apparatus for measuring a coherence sampling quality-factor (Q-factor), used for measuring a Q-factor of a baseband signal, comprising:
    a wavelength converter, for receiving a tested optical signal and a first optical signal and converting the wavelength to generate a second optical signal; and
    an optical switch, for outputting an optical pulse, wherein the optical pulse has the same wavelength as the second optical signal;
    wherein the optical pulse is used to sample the second optical signal in wavelength coherence, to reconstruct the baseband signal after sampling, and to measure the Q-factor according to the baseband signal.

2. The apparatus for measuring a coherence sampling Q-factor as claimed in claim 1, wherein the wavelength converter and the optical switch are connected to an optical receiver through a first optical connection, and the optical receiver is used to conduct wavelength coherence sampling of the second optical signal and the measurement of the Q-factor.

3. The apparatus for measuring a coherence sampling Q-factor as claimed in claim 2, further comprising an optical filter used to receive the second optical signal, wherein the optical filter and the optical switch are connected to the optical receiver through the first optical connection.

4. The apparatus for measuring a coherence sampling Q-factor as claimed in claim 2, wherein the first optical connection at least comprises an optical coupler.

5. The apparatus for measuring a coherence sampling Q-factor as claimed in claim 1, wherein the wavelength of the second optical signal is the same as that of the first optical signal, and the first optical signal is generated by an optical generator.

6. The apparatus for measuring a coherence sampling Q-factor as claimed in claim 5, wherein the optical pulse is generated according to the first optical signal.

7. The apparatus for measuring a coherence sampling Q-factor as claimed in claim 5, wherein the optical generator is connected to the wavelength converter and the optical switch through a second optical connection; and the second optical connection at least comprises an optical splitter.

8. The apparatus for measuring a coherence sampling Q-factor as claimed in claim 7, wherein the optical generator is a wavelength tunable laser diode.

9. The apparatus for measuring a coherence sampling Q-factor as claimed in claim 7, wherein the optical generator is a wavelength fixed laser diode.

10. An apparatus for measuring a coherence sampling Q-factor, used for measuring a Q-factor of a baseband signal, comprising:
   an optical generator, for generating and outputting a first optical signal;
   a wavelength converter, for receiving the first optical signal and a tested optical signal to generate a second optical signal, wherein the second optical signal is generated after the wavelength of the tested optical signal has already been converted according to the wavelength of the first optical signal;
   an optical switch, for outputting an optical pulse according to the first optical signal, wherein the wavelength of the optical pulse is the same as that of the second optical signal; and
   an optical receiver, for receiving the second optical signal and the optical pulse, wherein the optical pulse is used to coherently sample the second optical signal to generate the baseband signal and then the Q-factor is measured according to the baseband signal.

11. The apparatus for measuring a coherence sampling Q-factor as claimed in claim 10, wherein the optical generator is connected to the wavelength converter and the optical switch through an optical splitting connection; and the optical splitting connection at least comprises an optical splitter.

12. The apparatus for measuring a coherence sampling Q-factor as claimed in claim 10, wherein the wavelength converter and the optical switch are connected to the optical receiver through an optical coupling connection; and the optical coupling connection at least comprises one optical coupler.

13. The apparatus for measuring a coherence sampling Q-factor as claimed in claim 12, further comprising an optical filter used to filter the second optical signal, wherein the optical filter and the optical switch are connected to the optical receiver through the optical coupling connection.

14. The apparatus for measuring a coherence sampling Q-factor as claimed in claim 13, wherein the optical generator is a wavelength tunable laser diode.

15. The apparatus for measuring a coherence sampling Q-factor as claimed in claim 13, wherein the optical generator is a wavelength fixed laser diode.

16. A method for measuring a coherence sampling Q-factor, used for measuring a Q-factor of a baseband signal and evaluating the quality of the baseband signal according to the Q-factor, comprising:
   receiving a tested optical signal, wherein the tested optical signal comprises the baseband signal;
   generating a first optical signal and outputting the first optical signal;
   converting the wavelength of the tested optical signal into the same wavelength as that of the first optical signal, and generating a second optical signal after the conversion process;
   outputting an optical pulse according to the first optical signal, wherein the wavelength of the optical pulse is the same as that of the second optical signal;
   sampling the second optical signal according to the optical pulse to reconstruct the baseband signal;
   measuring the Q-factor of the baseband signal; and
   evaluating the quality of the baseband signal.

17. The method for measuring a coherence sampling Q-factor as claimed in claim 16, wherein the method is used in an optical network.

18. The method for measuring a coherence sampling Q-factor as claimed in claim 17, wherein the step of converting the wavelength of the tested optical signal into the same wavelength as that of the first optical signal is a wavelength coherence.

19. The method for measuring a coherence sampling Q-factor as claimed in claim 17, wherein the wavelength of the optical pulse is the same as that of the second optical signal; and according to the optical pulse, the second optical signal is sampled to reconstruct the baseband signal, which is a wavelength coherence sampling.

20. The method for measuring a coherence sampling Q-factor as claimed in claim 16, wherein the step of converting and generating the second optical signal further comprises a step of filtering and then outputting the second optical signal.

* * * * *

UNITED STATES PATENT AND TRADEMARK OFFICE
CERTIFICATE OF CORRECTION

PATENT NO. : 7,532,818 B2
APPLICATION NO. : 11/475877
DATED : May 12, 2009
INVENTOR(S) : Hsu et al.

It is certified that error appears in the above-identified patent and that said Letters Patent is hereby corrected as shown below:

Title Page, Item (73) Assignee's residence:

"Industrial Technology Research Institute, Hsinchu Taiwan (CN)" should be changed to --Industrial Technology Research Institute, Hsinchu (TW)--

Signed and Sealed this
Twenty-third Day of June, 2015

Michelle K. Lee
*Director of the United States Patent and Trademark Office*